United States Patent [19]

Smidth

[11] Patent Number: 4,837,642
[45] Date of Patent: Jun. 6, 1989

[54] THRESHOLD TRACKING SYSTEM

[75] Inventor: Peter Smidth, Menlo Park, Calif.

[73] Assignee: Ampex Corporation, Redwood City, Calif.

[21] Appl. No.: 143,911

[22] Filed: Jan. 12, 1988

[51] Int. Cl.$^4$ .............................................. G11B 5/09
[52] U.S. Cl. ........................................ 360/46; 360/40
[58] Field of Search ...................... 375/94; 360/46, 40, 360/67, 39

[56] References Cited

U.S. PATENT DOCUMENTS

| | | | |
|---|---|---|---|
| 3,214,700 | 10/1965 | Hook ................................... | 328/165 |
| 3,478,255 | 9/1966 | Parker et al. ............................. | 320/1 |
| 3,534,273 | 12/1967 | Thomas ................................. | 328/162 |
| 3,660,821 | 5/1972 | Weber et al. ................. | 340/174.1 H |
| 4,399,474 | 8/1983 | Coleman ................................ | 360/40 |
| 4,475,210 | 10/1984 | Couch ................................... | 375/10 |

OTHER PUBLICATIONS

IBM Technical Disclosure Bulletin, vol. 20, No. 2 (Jul., 1977), entitled "Data Demodulator Circuit Arrangement".

Primary Examiner—Vincent P. Canney
Attorney, Agent, or Firm—Robert E. Krebs; Richard P. Lange

[57] ABSTRACT

A decoder system for decoding signals such as Class IV partial-response signals. In the decoder system, threshold levels are used to distinguish between binary ones and zeros in partial-response signals. The threshold levels are adjusted by a feedback system to automatically compensate for effects such as signal dropouts.

11 Claims, 3 Drawing Sheets

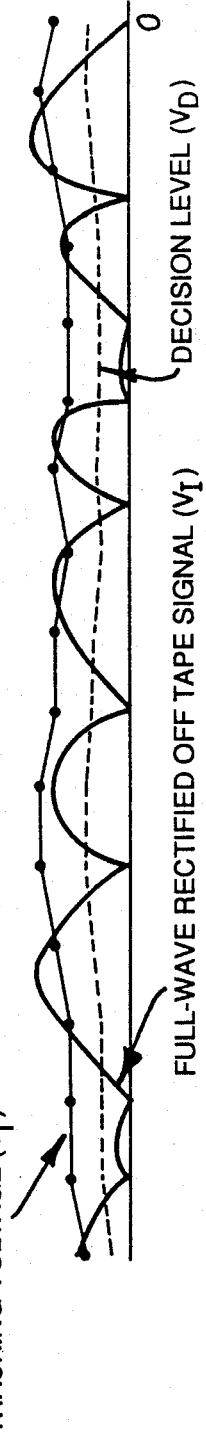
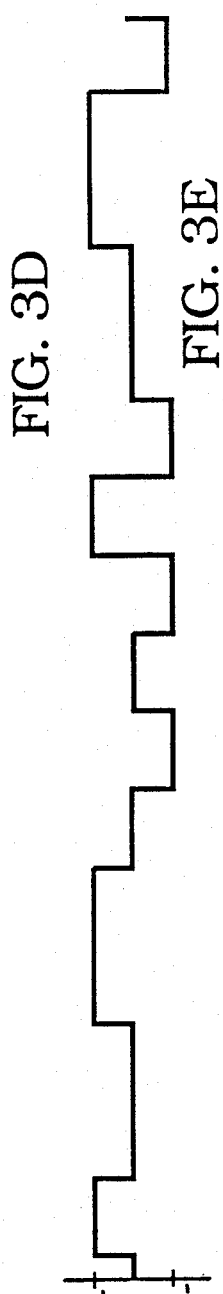
FIG. 3A
FIG. 3B
FIG. 3C
FIG. 3D
FIG. 3E

THRESHOLD TRACKING SYSTEM

BACKGROUND OF THE INVENTION

1. Field of the Invention

The present invention generally relates to systems for decoding signals such as Class IV partial-response signals and, more particularly, to systems wherein threshold levels that are used to distinguish between binary ones and zeros when decoding partial-response signals are adjusted automatically to compensate for effects such as signal dropouts.

2. State of the Art

In the art of recording information on magnetic media, various techniques have been developed to maximize data packing densities and to improve reproduced signal response in the presence of noise. In particular, a technique known as "Class IV partial-response coding" has proven beneficial to enhance the extraction of digital information from recordings on magnetic tape. Methods for encoding information in the partial-response signal format are disclosed in Kabal and Pasupathy, "Partial-Response Signalling", IEEE Transactions on Communications, Vol. COM-23, No. 9, Sept., 1975.

In reproducing digital data that has been recorded on magnetic tape, one advantage of Class IV partial-response coding is that signal-to-noise ratios of off-tape signals are significantly improved. Also, signals encoded by Class IV partial-response coding are DC free during tape playback, i.e., the encoded off-tape signals are automatically centered on zero volts. The use of partial-response coding in magnetic recording systems is described in an article by Kobayashi and Tang, "Application of Partial-Response Channel Coding to Magnetic Recording Systems", IBM J. Res. & Devel., July, 1970.

Partial-response coding of digital signal information, however, has several drawbacks. One drawback is that the encoded partial-response signals are not binary but have three levels. Generally speaking, this problem can be overcome by full-wave rectification of the off-tape partial-response signals. A more significant problem is that changes in the amplitude of off-tape partial-response signals can adversely affect decoding accuracy. In practice, amplitude in off-tape signals occur frequently, usually as a result of dropouts. Usually, dropouts are common in magnetic recording tapes having high data packing densities.

To decode Class IV partial response signals, it is conventional to employ comparators having fixed voltages which determine threshold levels. The thresholds are usually fixed mid-way between the center level (i.e., zero volts) and the absolute value of the normal outer envelope level for the partial-response signal. (The outer envelope levels are defined with reference to ternary eye patterns for partial-response signals; the ternary eye patterns are described by Kabal, et al., supra.) With fixed decoding thresholds, however, a dropout that causes a decrease in the peak-to-peak amplitude of a partial-response signal for the duration of some number of data bits can result in a logical "1" being erroneously decoded as a logical "0" during the dropout period even in the absence of noise. With electronic noise present, decoding errors may occur even with lesser signal reductions.

U.S. Pat. No. 4,399,474 suggests that threshold voltages employed in decoding Class IV partial-response signals should be automatically adjusted in accordance with changes in amplitude of the partial-response signals. The goal of the automatic adjustment is to change threshold voltages in proportion to scale changes in the levels of the partial-response signals in the absence of noise. In particular, the patent discloses a system including first and second sample-and-hold circuits. The first sample-and-hold circuit provides an output which is updated each sampling period to represent the amplitude of the most recently sampled partial-response signal. The second sample-and-hold circuit provides an output the reproduces the output of the first sample-and-hold circuit only when the amplitude of a sampled partial-response signal equals or exceeds a predetermined fraction of the amplitude of the next-previously sampled partial-response signal. According to the patent, threshold voltages are adjusted as a function of the output signals from the second sample-and-hold circuit; that is, threshold voltages track changes in the amplitude scale of partial-response signals.

Although systems according to U.S. Pat. No. 4,399,474 are effective in minimizing decoding errors due to shallow dropouts (i.e., ones in which the partial-response signal drops only a few dB), the system is complex and expensive to implement. In part, the implementation difficulties arise because decoding requires sampling partial-response signals at high rates such as 100 MHz and, therefore, requires rapid operating cycles for the sample-and-hold circuits. While such high-speed sample-and-hold circuits can be designed, they are difficult to manufacture.

OBJECTS AND SUMMARY OF INVENTION

An object of the present invention is to provide a simplified system for decoding signals such as Class IV partial-response signals and, more particularly, to provide a system for automatically adjusting threshold levels when decoding partial-response signals so that decoding errors are minimized.

Another object of the present invention is to provide an improved system which automatically compensate for the effects of partial dropouts and signal modulation when decoding partial-response signals.

These and other objects of the present invention will become more apparent on reference to the following description and accompanying drawings.

BRIEF DESCRIPTION OF THE DRAWINGS

In the Drawings:

FIGS. 3a through 3e are timing diagrams that illustrate operation of the system of FIG. 2.

DETAILED DESCRIPTION OF THE PREFERRED EMBODIMENT

Figure 1:
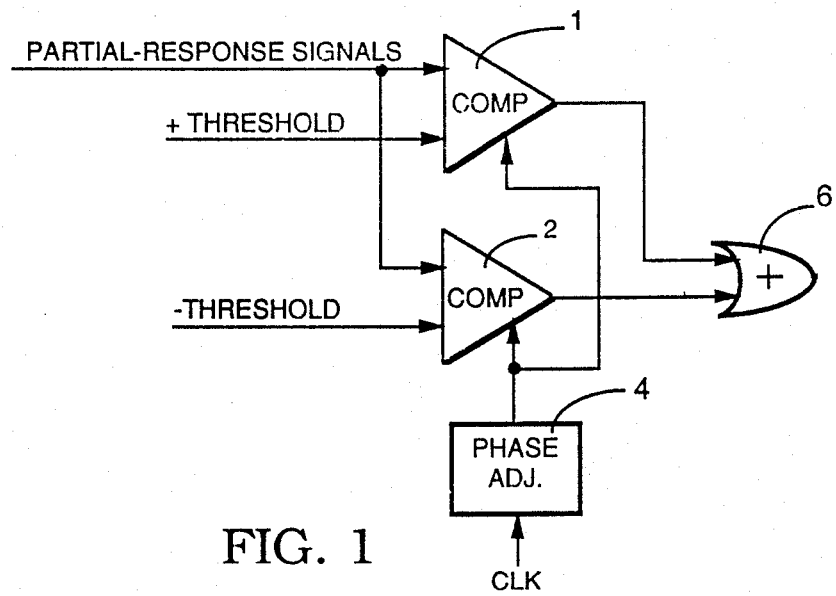
FIG. 1 is a block diagram of a system according to the prior art for decoding Class IV partial-response signals.

FIG. 1 shows prior art system for decoding partial-response signals such as are obtained from a magnetic recording medium via a conventional magnetic read head. This system employs comparators 1 and 2 which receive partial-response signals and threshold reference signals. In particular, a positive fixed threshold level is coupled to comparator 1 and a negative fixed threshold level is coupled to comparator 2. Comparators 1 and 2 are gated by clock pulses via a phase adjusting circuit 4. In operation of the system of FIG. 1, whenever one of the comparators is actuated a partial-response signal is greater than the positive threshold level or less than the negative threshold level at a clocking instant. When a partial-response signal is neither greater than the positive threshold reference nor less than the negative threshold reference at the clocking instant, neither comparator is actuated.

Further in the system of FIG. 1, an OR gate 6 provides a binary output whenever either comparator 1 or 2 outputs a signal. That is, the output of OR gate 6 is a binary "1" whenever a partial-response signal is either higher than the positive threshold level or lower than the negative threshold level. For all other levels of the partial-response signal, the output of OR gate 6 is a binary "0". Consequently, the output of OR gate 6 constitutes the partial response signal decoded in binary format.

Figure 2:
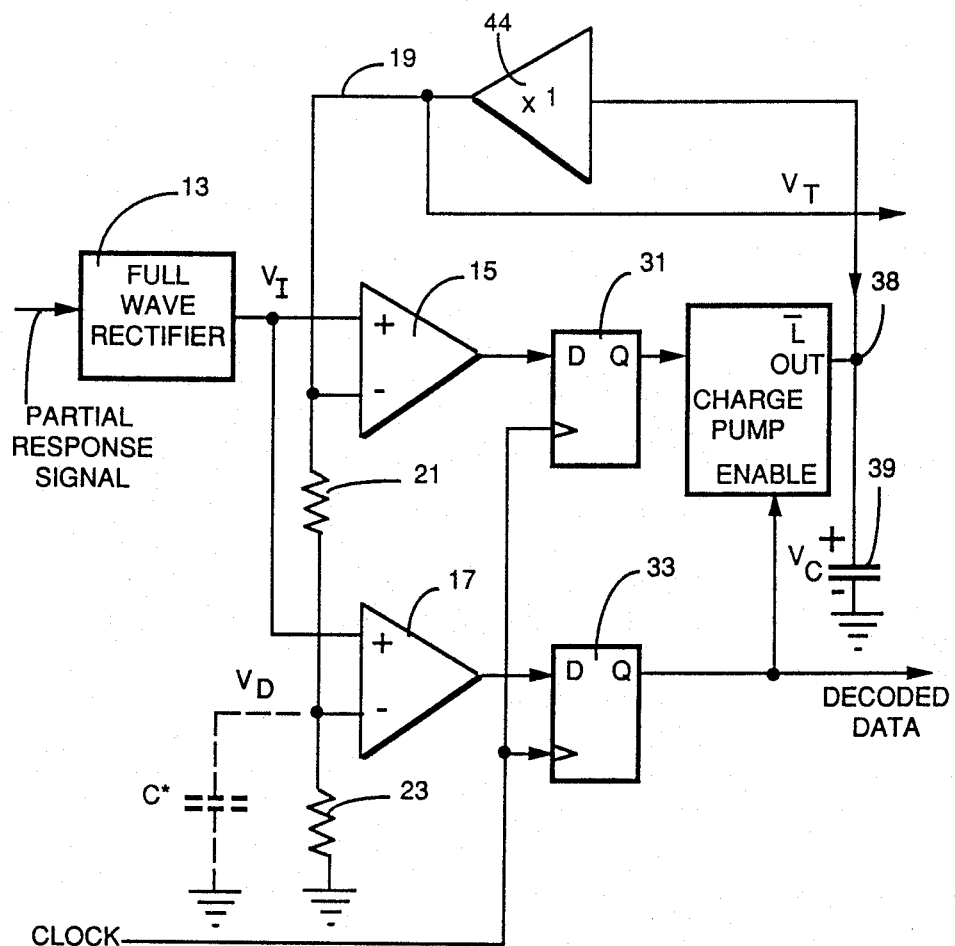
FIG. 2 is a block diagram of a system for decoding partial-response signals, which system includes a threshold tracking system according to the present invention.

FIG. 2 shows an improved system for decoding partial-response signals. In the system, a rectifier 13 provides full-wave rectification of off-tape partial-response signals. Operation of rectifier 13 is described in terms of eye pattern diagrams in U.S. Pat. No. 4,399,474. By full-wave rectifying the off-tape partial-response signals, all the signal amplitudes are converted into their absolute values.

As also shown in FIG. 2, the rectified partial-response signals are provided to a first comparator 15 and to a second comparator 17. The other signals received by comparators 15 and 17 are feedback signals carried on line 19. It should be noted that, at the inverting input of comparator 17, series resistors 21 and 23 provide voltage division of the feedback signal. Normally, the two resistors have the same value and, therefore, comparator 17 receives a voltage which is one-half the feedback voltage. Comparators 15 and 17 are conventional and, as such, receive analog inputs and provide binary output signals that depend upon the comparison between the inputs. In particular, comparator 15 provides a logical "1" output if the amplitude of the partial-response signal at its non-inverting input exceeds the amplitude of the feedback signal at its inverting input; otherwise, the comparator provides a logical "0" output. Similarly, comparator 17 provides a logical "1" output if the amplitude of the partial-response signal at its non-inverting input exceeds the amplitude of the voltage-divided feedback signal at its inverting input and, otherwise, comparator 17 provides a logical "0" output.

As further shown in FIG. 2, output signals from comparator 15 are provided to the data input of a D-type flip-flop 31. Flip-flop 31 is gated to transfer data to its output whenever there is a positive-going transition of a clock pulse. Similarly, output signals from comparator 17 are provided to the data input of a D-type flip-flop 33 which is also gated by the clock pulses.

As also shown in FIG. 2, the output of flip-flop 31 is connected to a charge pump 37. The charge pump 37 is also connected to be selectively enabled, or disabled, by the output of flip-flop 33.

Finally, as shown by FIG. 2, the output of charge pump 37 is connected to one node 38 of a compacitor 39 whose other node is grounded. In practice, capacitor 39 is generally linear, which is to say that the voltage across it is linearly proportional to accumulated charge. In practice, capacitor 39 normally has a value of a few thousand picofarads. It should be noted that conductor 19 extends from node 38 to provide voltage feedback to comparators 15 and 17. Preferably, a unity-gain buffer 41 interposed in line 19 to prevent discharge of capacitor 39 by resistors 21 and 23. The voltage at the output of unity-gain buffer 41 equals the voltage across capacitor 39 and, in the following, is referred to as the threshold tracking voltage $V_T$.

FIGS. 3a through 3e are timing diagrams that illustrate operation of the system of FIG. 2. FIG. 3a shows a periodic train of clock pulses having generally rectangular shape. The arrows indicate the rising edges of the pulses; those edges gate the data transfer devices. Typically, the period of the clock pulses is about ten nanoseconds in applications involving high-density magnetic tape recordings. The sampling times $t_o, t_i \ldots t_n$ coincide with the rising edges of the clock pulses. Circuits to generate the clock pulses are described in U.S. Pat. No. 4,399,474. It may be noted that the rising edges of the clock pulses coincide with the foci or crossing times of the ternary eye patterns for Class IV partial-response signals.

In FIG. 3b, the heavy curve indicates an off-tape partial response signal $V_I$ such as may occur upon replay of digitally-encoded information recorded on magnetic tape. It should be noted that the off-tape signal, $V_I$, has been full-wave rectified and, therefore, displays no negative voltage values.

The lighter line in FIG. 3b illustrates the tracking voltage, $V_T$, as a function of time. It may be noted that the initial value of the tracking voltage (i.e., the amplitude of $V_T$ at time $t_o$) is arbitrary. For purposes of understanding operation of the system of FIG. 3, changes in the amplitude of the tracking voltage are important, not its initial value.

The dashed line in FIG. 3b is drawn parallel to tracking voltage $V_T$ and has half of its amplitude. In terms of FIG. 2, the dashed line depicts the "decision" voltage, $V_d$, at the input to second comparator 17.

FIG. 3c shows output signals from flip-flop 33. These ouput signals are generally rectangular pulses which begin and end at the sampling times. More particularly, the output signals from flip-flop 33 have zero amplitude whenever a sampled off-tape partial-response signal $V_I$ has an amplitude less than one-half the tracking voltage, $V_t$, and the output signals from flip-flop have positive amplitude (i.e., binary level "1") when a sampled off-tape signal $V_I$ has an amplitude greater than one-half the tracking voltage $V_T$. For example, the amplitude of the output of flip-flop 33 is logical "0" from sampling times $t_1$ to $t_3$ and from sampling times $t_5$ to $t_6$. Also, the amplitude of the output from flip-flop 33 is a logical "1" from sampling times $t_o$ to $t_1$ and from sampling times $t_3$ to $t_5$. It should be noted that the output signals from flip-flop 33 are, in fact, decoded partial-response signals where the decoding has been done relative to decision voltage $V_D$.

FIG. 3d shows output signals from flip-flop 31. Again, the output signals are generally rectangular pulses which begin and end at the sampling times. The output signals from flip-flop 31 have zero amplitude when a sampled off-tape partial-response signal $V_I$ has amplitude less than the tracking voltage $V_T$, and have positive amplitude when a sampled off-tape signal has amplitude greater than the tracking voltage $V_T$. For example, the amplitude of the output of flip-flop 31 is logical "0" from sampling times $t_1$ to $t_3$ and from sampling times $t_5$ to $t_8$, and is a logical "1" from sampling times $t_o$ to $t_1$ and from sampling times $t_9$ to $t_{10}$.

FIG. 3e shows output current from charge pump 37 at the sampling times. As previously mentioned, output current from the charge pump is provided only when the charge pump is enabled by a positive output from flip-flop 33. Thus, in terms of the timing diagrams, charge pump 37 provides an output only when the amplitude of the off-tape signal $V_I$ exceeds one-half the amplitude of tracking voltage $V_T$. During such times, output current from charge pump 37 is either positive or negative. Positive current is provided only when the amplitude of the off-tape signal $V_I$ exceeds the tracking voltage $V_T$, and negative current is provided only when the amplitude of the off-tape signal $V_I$ is less than tracking voltage $V_T$. In practice, the positive and negative currents have values of a few milliamps.

Figure 4:
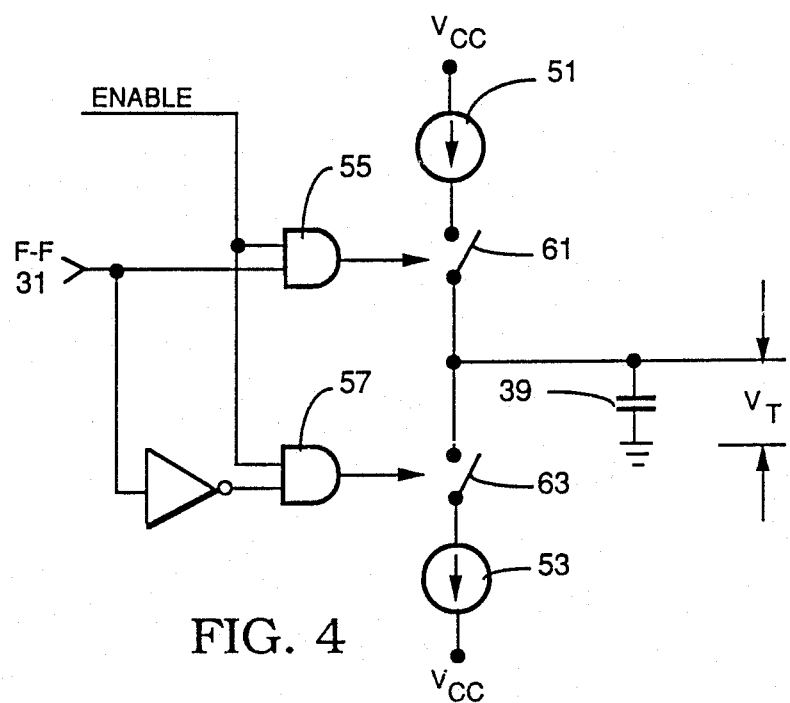
FIG. 4 is a schematic diagram of circuit comprising the charge pump of FIG. 2.

Finally with regard to the timing diagrams, it should be understood that the output currents from charge pump 37 cause changes in tracking voltage $V_T$. This is because current flow to capacitor 39 of FIG. 2 changes the voltage across the capacitor and, hence, changes tracking voltage $V_T$. When there is positive current from charge pump 37, as between sampling times $t_0$ and $t_1$ and between sampling times $t_3$ and $t_5$, the tracking voltage $V_T$ increases. Conversely, when there is negative current from charge pump 37, as between sampling times $t_6$ to $t_9$, tracking voltage $V_T$ decreases. When there is no positive or negative current from charge pump, as between sampling times $t_1$ to $t_3$, tracking voltage $V_T$ remains constant. FIG. 4 shows one embodiment of charge pump 37. In this embodiment, the charge pump includes current sources 51 and 53 connected to constant voltage source $V_{cc}$. The charge pump 37 also includes AND gates 55 and 57 which are connected to receive the enable signals from flip-flop 33 as well as the output signals from flip-flop 379 More particularly, the output from flip-flop 37 is inverted at the input to AND gate 57. The outputs of AND gates 55 and 57 control transistor switches 61 and 63, respectively. Preferably, the circuit of FIG. 4 is partly implemented with emitter-coupled logic because of operating speed.

In operation of the circuit of FIG. 4, AND gates 55 and 57 can provide an output only in the presence of binary "1" to enable signals from flip-flop 33. The one of the AND gates which is operative in the presence of an enable signal depends upon whether flip-flop 31 provides a binary "1" or binary "0" output such times. Because of the inversion at the input to AND gate 57, only one of the AND gates 55 or 57 can be operative to produce a binary "1" output during the period of an enable signal from flip-flop 33. When AND gate 55 is operative, switch 61 is closed to connect current source 61 to capacitor 39, thereby to increase the charge on the capacitor. When AND gate 57 is operative, switch 63 is closed to connect current source 63 to capacitor 39, thereby to decrease or drain charge from the capacitor.

Although a preferred embodiment of the present invention has been illustrated and described, various modifications, alternatives and equivalents thereof will become apparent to those skilled in the art. For example, it should be recognized that comparator 15 and flip-flop 31 can be integrated into a single device and that, likewise, comparator 17 and flip-flop 33 can be integrated into a single device. As another example of an alternative, it should be noted that charge pump 37 can also be implemented as an integrator with an enable control. Furthermore, although the present invention is usable for reducing errors in decoding playback signals from magnetic recordings, it will be apparent to those skilled in the art that the invention can be applied in connection with other types of partial-response signal decoding systems and to devices other than magnetic recorders. In view of such alternatives, it should be understand that the scope of the present invention is defined only by the appended claims and equivalents thereof.

What is claimed is:

1. A method for decoding partial-response signals wherein decision threshold levels are automatically adjusted in proportion to variations in the amplitude of the partial-response signal, whose level at a specified clock time represents one binary state if the level exceeds a positive threshold level and represents another digital binary state if the level is below the threshold level, comprising the steps of:
   comparing the amplitude of a partial-response signal with the amplitude of a feedback signal;
   comparing the amplitude of the partial-response signal with a predetermined fraction of the amplitude of the feedback signal and providing an enable signal only when this comparison indicates that the partial-response signal exceeds the predetermined fraction of the feedback signal;
   only when an enable signal is present, increasing the charge on a charge storage device when the amplitude of the partial-response signal exceeds the amplitude of the feedback signal and decreasing the charge on the charge storage device when the amplitude of the partial-response signal is less than the amplitude of the feedback signal.

2. A method according to claim 1 wherein a binary signal is provided as a result of the comparison of the threshold voltage signal with the predetermined fraction of the feedback signal, which binary signals represent the decoded partial-response signal.

3. A method according to claim 1 wherein the predetermined fraction is one-half.

4. An apparatus for decoding partial-response signals whose amplitude at specified clock times represent a first binary state if the amplitude level exceeds a positive threshold and represents a second binary state if the signal level is below the threshold level comprising:
   rectifying means for providing full-wave rectification of a partial-response signal;
   first comparator means connected to compare the amplitude of full-wave rectified signals with the amplitude of a first feedback voltage signal;
   second comparator means connected for comparing the amplitude of the rectified signals with a second feedback signal which is a predetermined fraction of the first feedback signal;
   enabling means for providing an enable signal only when the comparison provided by the second comparator means indicates that the amplitude of the rectified partial-response signal exceeds the amplitude of the second feedback signal;
   a charge storage means; and
   charge pump means operative only in the presence of an enable signal for increasing the charge on the charge storage means when the amplitude of a rectified partial-response signal exceeds the first feedback signal and for decreasing the charge on the charge storage device when the amplitude of a rectified partial-response signal is less than the first feedback signal.

5. A system according to claim 4 wherein the first and second comparator means include comparators which provide binary output signals.

6. A system according to claim 4 further including a first binary data transfer means connected to receive the output of the first comparator means and a second binary data transfer means connected to receive the output of the second comparator means.

7. A system according to claim 6 further including a clock means for generating periodic clock pulses whose periods determine sampling times for the partial-response signal, said clock means being connected to the first and second data transfer devices to control data transfer from their inputs to their outputs.

8. A system according to claim 4 wherein the charge storage device is a capacitor.

9. A system according to claim 4 wherein the charge pump means comprises a current source for selectively increasing the charge on the charge storage device and a current drain for selectively decreasing the charge on the charge storage device.

10. A system according to claim 4 wherein the enabling means comprises an AND-gate that is connected to the second data transfer means.

11. A system according to claim 10 wherein the AND-gate is also connected to receive the output signal from the first data transfer device.

* * * * *